US012800078B2

(12) United States Patent
Koch et al.

(10) Patent No.: US 12,800,078 B2
(45) Date of Patent: Nov. 17, 2026

(54) FLANGELESS COUPLINGS FOR CONNECTING TUBULAR CONDUITS AND RELATED EQUIPMENT

(71) Applicant: Scope Technology and Manufacturing, LLC, Houston, TX (US)

(72) Inventors: Christopher Mark Koch, Covington, TX (US); Samuel Montemayor, Houston, TX (US); Michael James Cornelssen, Spring, TX (US)

(73) Assignee: SCOPE TECHNOLOGY AND MANUFACTURING, LLC, Houston, TX (US)

(*) Notice: Subject to any disclaimer, the term of this patent is extended or adjusted under 35 U.S.C. 154(b) by 37 days.

(21) Appl. No.: 19/227,036

(22) Filed: Jun. 3, 2025

(65) Prior Publication Data

US 2025/0377058 A1 Dec. 11, 2025

Related U.S. Application Data

(60) Provisional application No. 63/656,823, filed on Jun. 6, 2024.

(51) Int. Cl.

*F16L 25/06* (2006.01)
*F16L 25/08* (2006.01)
*F16L 37/12* (2006.01)

(52) U.S. Cl.

CPC ............. *F16L 25/065* (2013.01); *F16L 25/08* (2013.01); *F16L 37/12* (2013.01)

(58) Field of Classification Search

CPC ......... F16L 37/12; F16L 25/065; F16L 25/08; F16J 15/025

(Continued)

(56) References Cited

U.S. PATENT DOCUMENTS 2,382,375 A * 8/1945 Allen .................. F16L 27/0828 285/94
2,503,738 A * 4/1950 Horton .................... E04G 25/08 403/362

(Continued)

*Primary Examiner* — James M Hewitt, II
(74) *Attorney, Agent, or Firm* — CONLEY ROSE, P.C.

(57) ABSTRACT

A coupling for forming a fluid-tight connection between a first device and a second device includes a male connection member having a central axis and a radially outer surface. In addition, the coupling includes a female connection member having a central axis coaxially aligned with the central axis of the male connection member, a radially inner surface, and a radially outer surface. The female connection member includes a plurality of circumferentially-spaced holes extending radially from the radially outer surface of the female connection member to the radially inner surface of the female connection member. The male connection member is slidingly disposed in the female connection member. Further, the coupling includes a locking assembly configured to secure the female connection member to the male connection member. The locking assembly includes an annular locking ring disposed about the female connection member and the male connection member. The locking assembly also includes a plurality of circumferentially-spaced locking keys moveably coupled to the annular locking ring. The locking keys are radially positioned between the annular locking ring and the male connection member. Still further, the locking assembly includes a plurality of circumferentially-spaced lock actuation members coupled to annular locking ring. The lock actuation members are configured to move the locking keys radially inward relative to the annular locking ring, the female connection member, and the male connection member through the holes of the female connection member and into engagement with the male connection member. The lock actuation members are configured to move the locking keys radially outward relative to the annular locking ring, the female connection member, and (Continued)

the male connection member through the holes of the female connection member and out of engagement with the male connection member. Moreover, the coupling includes an annular seal assembly positioned between the male connection member and the female connection member, wherein the seal assembly is configured to form an annular seal between the male connection member and the female connection member.

22 Claims, 14 Drawing Sheets

(58) Field of Classification Search
USPC ...................................... 285/90–91, 403–404
See application file for complete search history.

(56) References Cited

U.S. PATENT DOCUMENTS

| | | | | |
|---|---|---|---|---|
| 3,606,393 | A * | 9/1971 | Huntsinger et al. .. | F16L 25/065 411/116 |
| 4,209,193 | A * | 6/1980 | Ahlstone ............... | E21B 17/043 285/321 |
| 6,905,148 | B2 | 6/2005 | Nguyen et al. | |
| 8,485,562 | B2 * | 7/2013 | Zerrer ................. | F16L 25/0036 285/251 |
| 10,316,999 | B2 * | 6/2019 | Kobayashi ............ | F16L 25/065 |
| 11,060,639 | B2 | 7/2021 | Cuvo et al. | |
| 2011/0127769 | A1 * | 6/2011 | Medina ............... | F16L 55/1152 29/525.01 |
| 2011/0148101 | A1 | 6/2011 | Manning | |
| 2022/0412487 | A1 | 12/2022 | McMillan | |

* cited by examiner

FLANGELESS COUPLINGS FOR CONNECTING TUBULAR CONDUITS AND RELATED EQUIPMENT

CROSS-REFERENCE TO RELATED APPLICATIONS

This application claims benefit of U.S. provisional patent application Ser. No. 63/656,823 filed Jun. 6, 2024 and entitled "Flangeless Couplings for Connecting Tubular Conduits and Related Equipment," which is hereby incorporated herein by reference in its entirety for all purposes.

STATEMENT REGARDING FEDERALLY SPONSORED RESEARCH OR DEVELOPMENT

Not applicable.

BACKGROUND

This disclosure relates generally to couplings for connecting a pair of adjacent devices that transport, control, and/or contain fluids. More particularly, the disclosure relates to flangeless couplings for connecting such a pair of adjacent devices.

Tubular conduits or pipes are used to transport fluids in many industrial applications (e.g., pipelines for transporting hydrocarbons, pipes for circulating fluids in connection with heat exchangers, pipelines for transporting chemicals in petrochemical facilities, etc.). In addition, a variety of different types of fluid control devices and fluid containment devices are used in connection with tubular conduits and pipes (e.g., valves, joints and adapters, spools, plugs, etc.). Typically, such pipes and/or related equipment are connected via mating flanges. Such flanged connections are formed by coaxially aligning the mating flanges and circumferentially aligning the bolt holes in the opposed flanges, urging the opposed faces of the flanges together with an annular gasket disposed therebetween, inserting bolts through the aligned bolt holes in the flanges, and then tightening the bolts (while ensuring the gasket remains properly positioned therebetween) to compress the opposed faces of the flanges together and form a generally fluid tight connection therebetween.

BRIEF SUMMARY OF THE DISCLOSURE

Embodiments of couplings for forming fluid tight seals between a first device and a second device are disclosed herein. In general, each device is configured to transport, contain, or control a fluid. In one embodiment, a coupling for forming a fluid-tight connection between a first device and a second device comprises a male connection member having a central axis and a radially outer surface. In addition, the coupling comprises a female connection member having a central axis coaxially aligned with the central axis of the male connection member, a radially inner surface, and a radially outer surface. The female connection member comprises a plurality of circumferentially-spaced holes extending radially from the radially outer surface of the female connection member to the radially inner surface of the female connection member. The male connection member is slidingly disposed in the female connection member. Further, the coupling comprises a locking assembly configured to secure the female connection member to the male connection member. The locking assembly comprises an annular locking ring disposed about the female connection member and the male connection member. The locking assembly also comprises a plurality of circumferentially-spaced locking keys moveably coupled to the annular locking ring. The locking keys are radially positioned between the annular locking ring and the male connection member. Still further, the locking assembly comprises a plurality of circumferentially-spaced lock actuation members coupled to annular locking ring. The lock actuation members are configured to move the locking keys radially inward relative to the annular locking ring, the female connection member, and the male connection member through the holes of the female connection member and into engagement with the male connection member. The lock actuation members are configured to move the locking keys radially outward relative to the annular locking ring, the female connection member, and the male connection member through the holes of the female connection member and out of engagement with the male connection member. Moreover, the coupling comprises an annular seal assembly positioned between the male connection member and the female connection member, wherein the seal assembly is configured to form an annular seal between the male connection member and the female connection member.

In another embodiment, a coupling for forming a fluid-tight connection between a first device and a second device comprises a male connection member having a central axis and a radially outer surface. In addition, the coupling comprises a female connection member having a central axis coaxially aligned with the central axis of the male connection member, a radially inner surface, and a radially outer surface, and wherein the female connection member includes a plurality of circumferentially-spaced holes extending radially from the radially outer surface of the female connection member to the radially inner surface of the female connection member. Further, the coupling comprises a locking assembly configured to releasably lock the female connection member within the male connection member. The locking assembly comprises an annular locking ring disposed about the female connection member and the male connection member. The locking assembly also comprises a plurality of circumferentially-spaced locking keys moveably coupled to the annular locking ring. Each locking key comprises a locked position extending radially through one of the holes in the in the female connection member and into engagement with the male connection member; and an unlocked position radially withdrawn from engagement with the male connection member.

Embodiments of methods for forming a fluid-tight connection between a first device and a second device are disclosed herein. In general, each device is configured to transport, contain, or control a fluid. In one embodiment, a method for forming a fluid-tight connection between a first device and a second device comprises (a) mounting an annular locking ring to a female connection member of the first device. The annular locking ring slidingly engages a radially outer surface of the female connection member. In addition, the method comprises (b) moveably coupling a plurality of circumferentially-spaced locking keys to the annular locking ring. Further, the method comprises (c) coaxially aligning a central axis of the female connection member and a central axis of the male connection member. Still further, the method comprises (d) moving the male connection member and the female connection member axially together to axially advance the male connection member into the female connection member after (c). The method also comprises (e) slidingly engaging a radially outer surface of the male connection member and a radially inner surface of the female connection member during (d). Moreover, the method comprises (f) moving the plurality of locking keys radially inward relative to the annular locking ring, through the female connection member, and into engagement with the male connection member after (d).

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
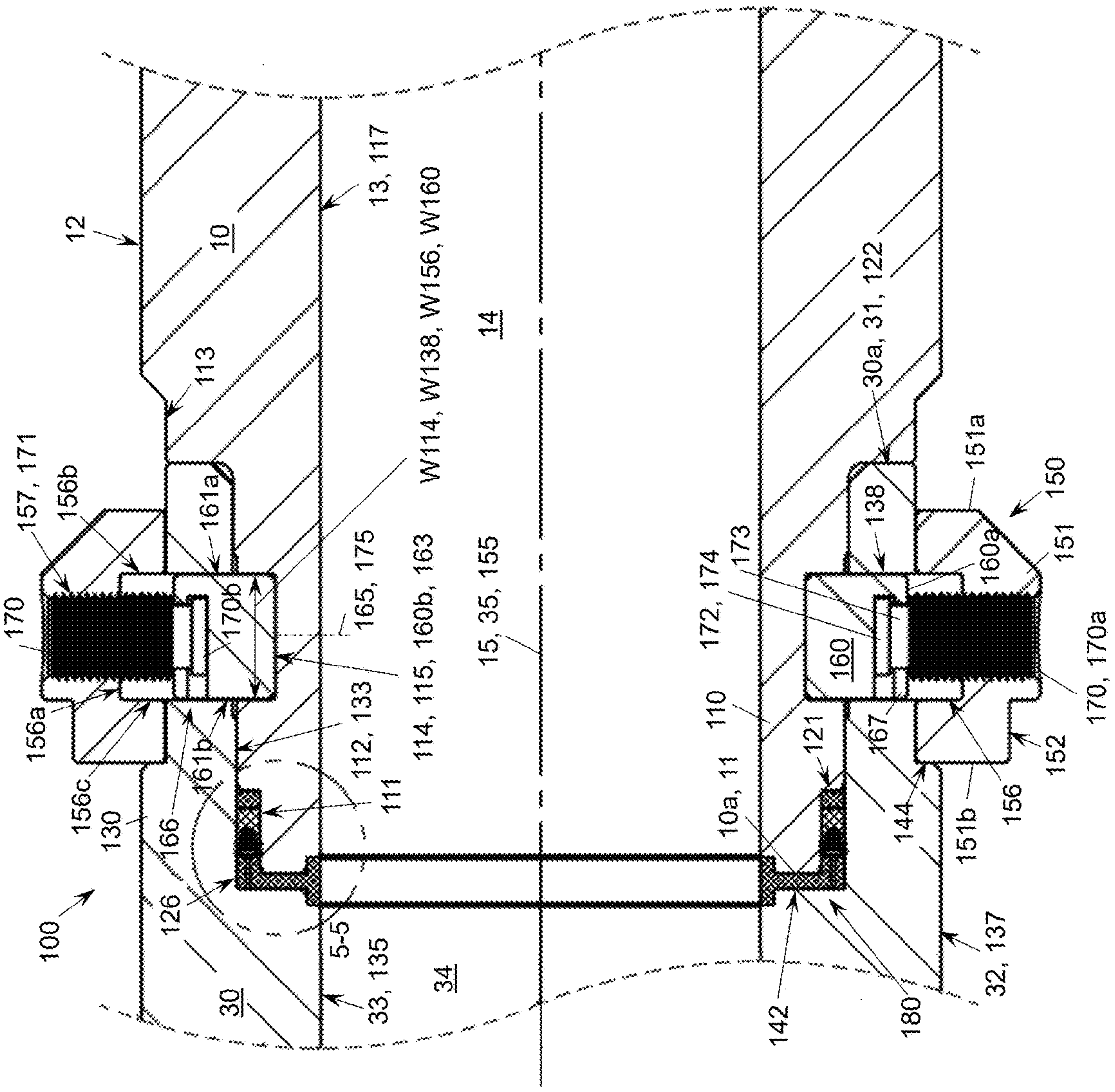
FIG. 1 is a cross-sectional view of an embodiment of a fluid tight coupling in accordance with the principles described herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

In the following discussion and in the claims, the terms "including" and "comprising" are used in an open-ended fashion, and thus should be interpreted to mean "including, but not limited to . . . " As used herein, the phrases "consist(s) of" and "consisting of" are used to refer to exclusive components of a composition, meaning only those expressly recited components are included in the composition; whereas the phrases "consist(s) essentially of" and "consisting essentially of" are used to refer to the primary components of a composition, meaning that only small or trace amounts of components other than the expressly recited components (e.g., impurities, byproducts, etc.) may be included in the composition. For example, a composition consisting of X and Y refers to a composition that only includes X and Y, and thus, does not include any other components; and a composition consisting essentially of X and Y refers to a composition that primarily comprises X and Y, but may include small or trace amounts of components other than X and Y. In embodiments described herein, any such small or trace amounts of components other than those expressly recited following the phrase "consist(s) essentially of" or "consisting essentially of" preferably represent less than 5.0 wt % of the composition, more preferably less than 4.0 wt % of the composition, even more preferably less than 3.0 wt % of the composition, and still more preferably less than 1.0 wt % of the composition. Use of broader terms such as comprises, includes, having, etc. should be understood to provide support for narrower terms such as consisting of, consisting essentially of, comprised substantially of, etc. Use of the term "optionally" with respect to any element of a claim is intended to mean that the subject element is required, or alternatively, is not required. Both alternatives are intended to be within the scope of the claim.

The term "couple" or "couples" is intended to mean either an indirect or direct connection. Thus, if a first device couples to a second device, that connection may be through a direct engagement between the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

As previously described, flange connections are typically used to form fluid tight connections between tubular conduits (e.g., pipes) and related equipment (e.g., fluid control devices, fluid containment devices, etc.) in industrial applications. However, such flange connections have several drawbacks. In particular, the process of aligning, mating, and connecting the flanges can be time-consuming. In addition, the use of specialized torque tools (e.g., torque wrenches) to tighten the bolts between the flanges (while ensuring proper positioning of the gasket) during assembly can create significant safety hazards in the form of pinch points. Accordingly, embodiments disclosed herein are directed to flangeless couplings for connecting tubular conduits (e.g., pipes) and related equipment, as well as methods of making same that offer the potential to (i) improve the speed at which fluid tight connections can be made, and (ii) reduce safety risks to personnel making up such connections.

Figure 2:
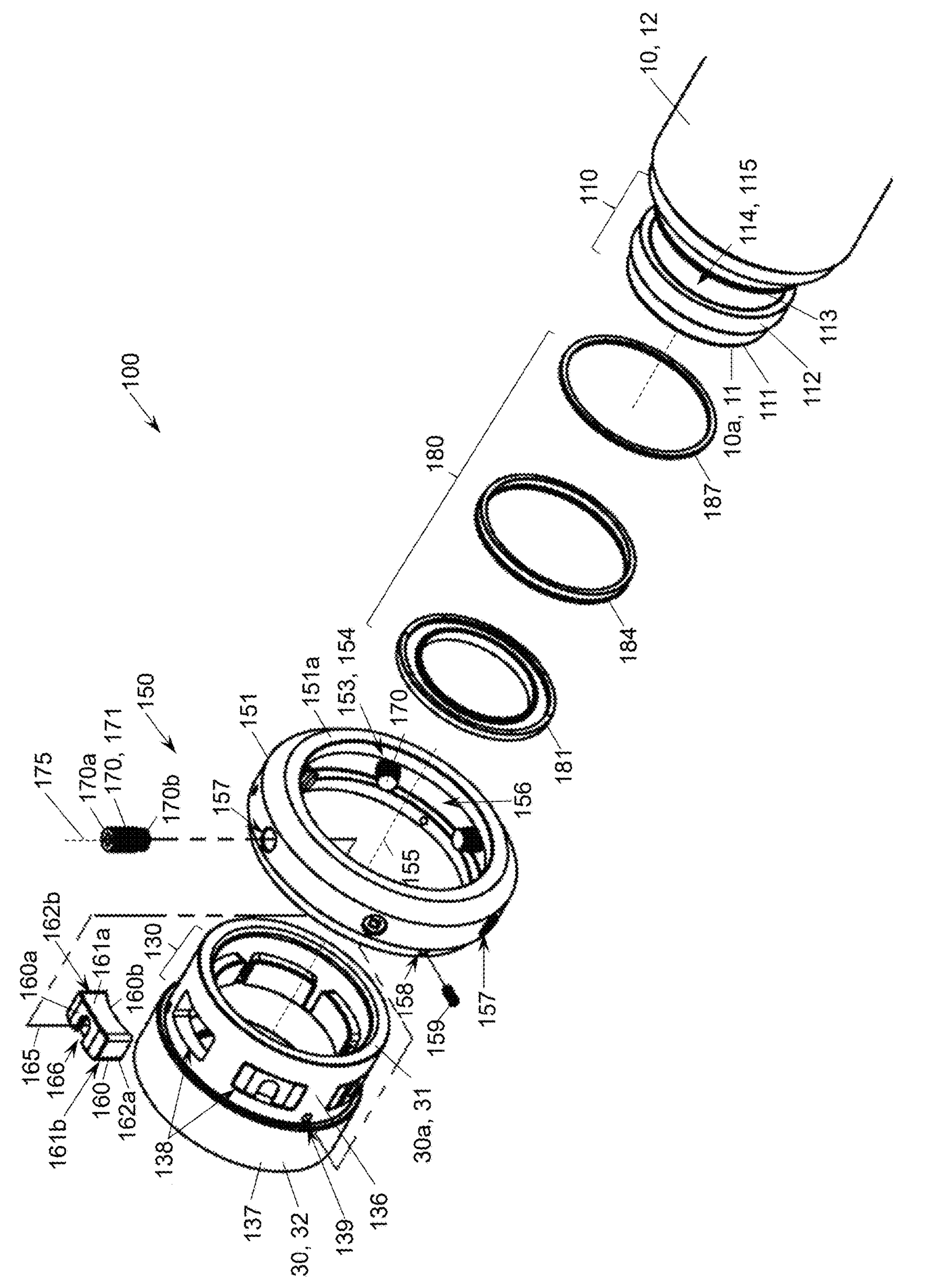
FIG. 2 is an exploded view of the fluid tight coupling of FIG. 1.

Referring now to FIGS. 1 and 2, an embodiment of a coupling 100 for connecting and forming a fluid tight seal between a pair of adjacent devices 10, 30 that transport, control, and/or contain fluids (e.g., liquids and/or gases) is shown. In this embodiment, devices 10, 30 are tubular conduits or pipes that flow fluids between different locations in an industrial setting. Accordingly, device 10 may also be referred to as a first tubular conduit 10 and device 30 may also be referred to as a second tubular conduit 30. However, as will be described in more detail below, coupling 100 can also be used to connect other combinations and types of devices that transport, control, and/or contain fluids (e.g., to connect a tubular conduit to a spool, to connect a tubular conduit to a valve or plug, to connect an adapter to a valve or tubular conduit, etc.).

In general, coupling 100 can be used to connect any desired number of adjacent tubular conduits 10, 30 end-to-end to form an elongate pipeline or flowline for flowing pressurized fluids (e.g., liquids and/or gases) between two different locations. Tubular conduits 10, 30 can be any type of pipe, tubular, conduit, or the like that are connected together end-to-end. As will be described in more detail below, coupling 100 does not include or rely on opposed flanges to connect tubular conduits 10, 30 or to form a fluid tight connection therebetween. Accordingly, coupling 100 may also be described as a "flangeless" coupling or connection.

Each tubular conduit 10, 30 has a central axis 15, 35, respectively, a first end **10*a*, 30*a*, respectively, and a second end (not shown) opposite first end 10*a*, 30*a*, respectively. Each end 10*a*, 30*a* is defined by an end surface 11, 31, respectively. In this embodiment, each end surface 11, 31 is a planar surface disposed in a plane oriented perpendicular to axes 15, 35, respectively. In addition, each tubular conduit 10, 30 has a radially outer surface 12, 32, respectively, extending axially from first end 10*a*, 30*a*, respectively, to the corresponding second end, and a radially inner surface 13, 33 extending axially from first end 10*a*, 30*a*, respectively, to the corresponding second end. Outer surfaces 12, 32 and inner surfaces 13, 33 are generally cylindrical. Inner surfaces 13, 33 define through passages 14, 34 of corresponding tubular conduits 10, 30**, which allow the flow of fluids therethrough.

As shown in FIGS. 1 and 2, end portions of tubular conduits 10, 30 extending axially from first ends **10*a*, 30*a*, respectively, are connected together with coupling 100, however, it should be appreciated that additional couplings 100 or other types of connections for tubular conduits can be used to connect one or both of the end portions of tubular conduits 10, 30 extending axially from second ends to other tubular conduits, adapters, or fittings. Central axes 15, 35 of tubular conduits 10, 30 are coaxially aligned when connected with coupling 100**.

In this embodiment, coupling 100 includes a first tubular connector or connection member 110 disposed at first end **10*a* of first tubular conduit 10, a second tubular connector or connection member 130 disposed at end 30*a* of second tubular conduit 30, a locking assembly 150 for releasably securing connection members 110, 130 together, and a seal assembly 180 for forming a fluid tight seal between connection members 110, 130. Connection members 110, 120, locking assembly 150, and seal assembly 180 are coaxially aligned with tubular conduits 10, 30, and thus, have central axes coincident with axes 15, 35. As connection members 110, 130 are disposed at ends 10*a*, 30*a*, respectively, of tubular conduits 10, 30, respectively, tubular conduits 10, 30 may also be described as including connection members 110, 130, respectively. First tubular connection member 110 is received by, seated within, and secured within second tubular connection member 130, and thus, first tubular connection member 110 may also be described as a "male" or "pin" connector or connection member and second tubular connection member 130** may also be referred to as a "female" or "box" connector or connection member.

Figure 3:
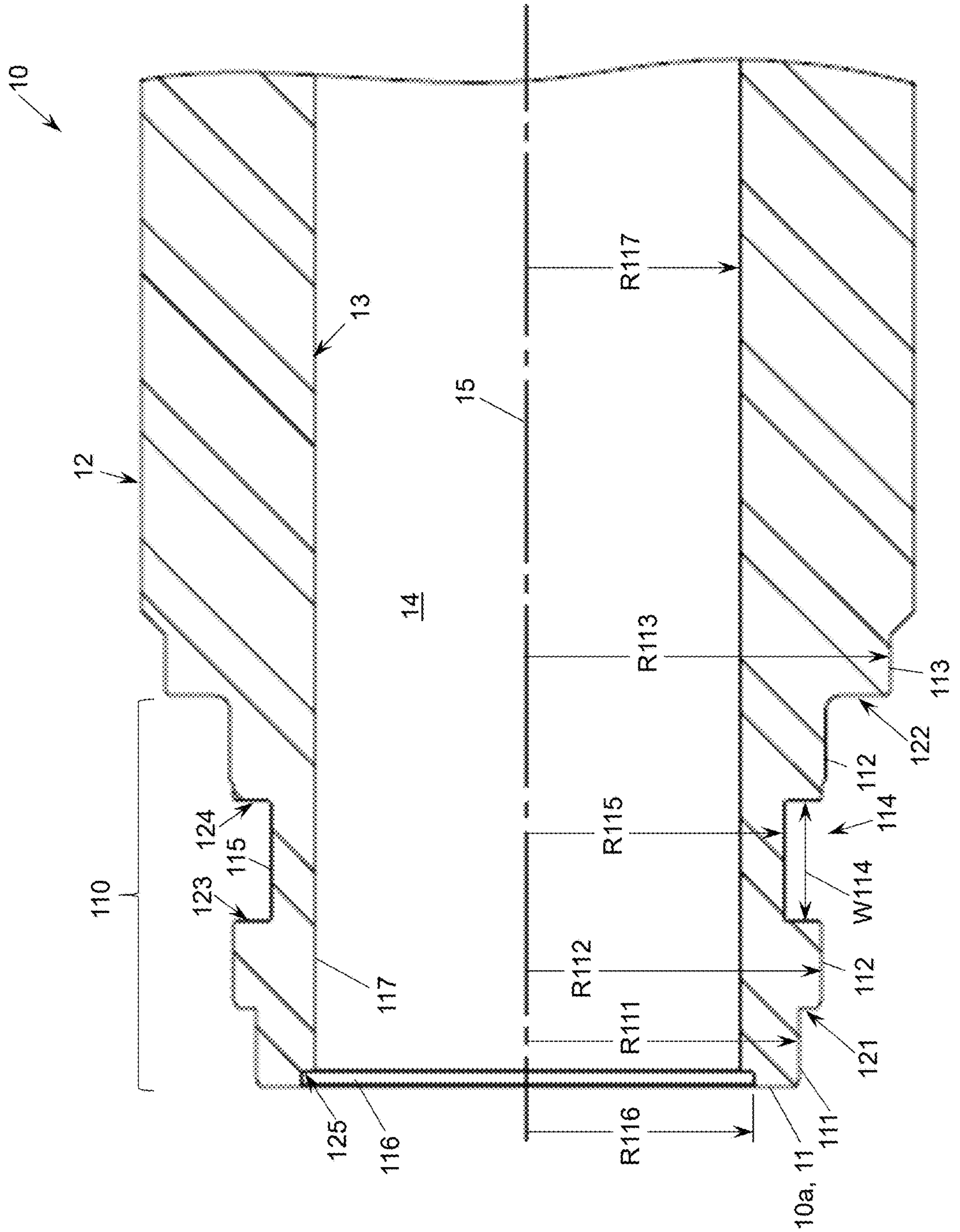
FIG. 3 is a cross-sectional view of the male connection member of FIG. 1.

Referring now to FIG. 3, male connection member 110 defines a generally stepped radially outer profile along outer surface 12 of tubular conduit 10 moving axially from first end **10*a*. More specifically, moving axially from end surface 11 at first end 10*a* along outer surface 12 of tubular conduit 10, the outer profile of male connection member 110 includes a first cylindrical surface 111 disposed at a radius R111 relative to central axis 15, a second cylindrical surface 112 disposed at a radius R112 relative to central axis 15, and a third cylindrical surface 113 disposed at a radius R113 relative to central axis 15. Thus, second cylindrical surface 112 is axially positioned between first cylindrical surface 111 and third cylindrical surface 113. Radius R111 is less than radius R112, and radius R112 is less than radius R113. Consequently, a first annular shoulder 121 extends radially outward from first cylindrical surface 111 to second cylindrical surface 112, and a second annular shoulder 122 extends radially outward from second cylindrical surface 112 to third cylindrical surface 113. An annular recess 114 is disposed along second cylindrical surface 112 and extends radially inward therefrom. In this embodiment, annular recess 114** is generally rectangular in cross-section as defined by a radially inner or lower cylindrical base surface

115 and a pair of annular shoulders 123, 124 extending radially outward from base surface 115 to second cylindrical surface 112. Annular recess 114 has a width W114 measured axially between annular shoulders 123, 124. As noted above, annular recess 114 extends radially inward from second cylindrical surface 112, and thus, base surface 115 is disposed at a radius R115 relative to central axis 15 that is less than the radius R112 of second cylindrical surface 112. In this embodiment, each annular shoulder 121, 122, 123, 124 is planar, and more specifically, is disposed in a plane oriented perpendicular to central axis 15.

Referring still to FIG. 3, male connection member 110 also defines a generally stepped radially inner profile along inner surface 13 of tubular conduit 10 moving axially from first end 10*a*. More specifically, moving axially from end surface 11 at first end 10*a* along inner surface 13 of tubular conduit 10, the inner profile of male connection member 110 includes a first cylindrical surface 116 disposed at a radius R116 relative to central axis 15 and a second cylindrical surface 117 disposed at a radius R117 relative to central axis 15. Second cylindrical surface 117 defines flow passage 14 of first tubular conduit 10. Radius R116 is greater than radius R117. Consequently, an annular shoulder 125 extends radially inward from first cylindrical surface 116 to second cylindrical surface 117. In this embodiment, annular shoulder 125 is planar, and more specifically, is disposed in a plane oriented perpendicular to central axis 15.

Figure 4:
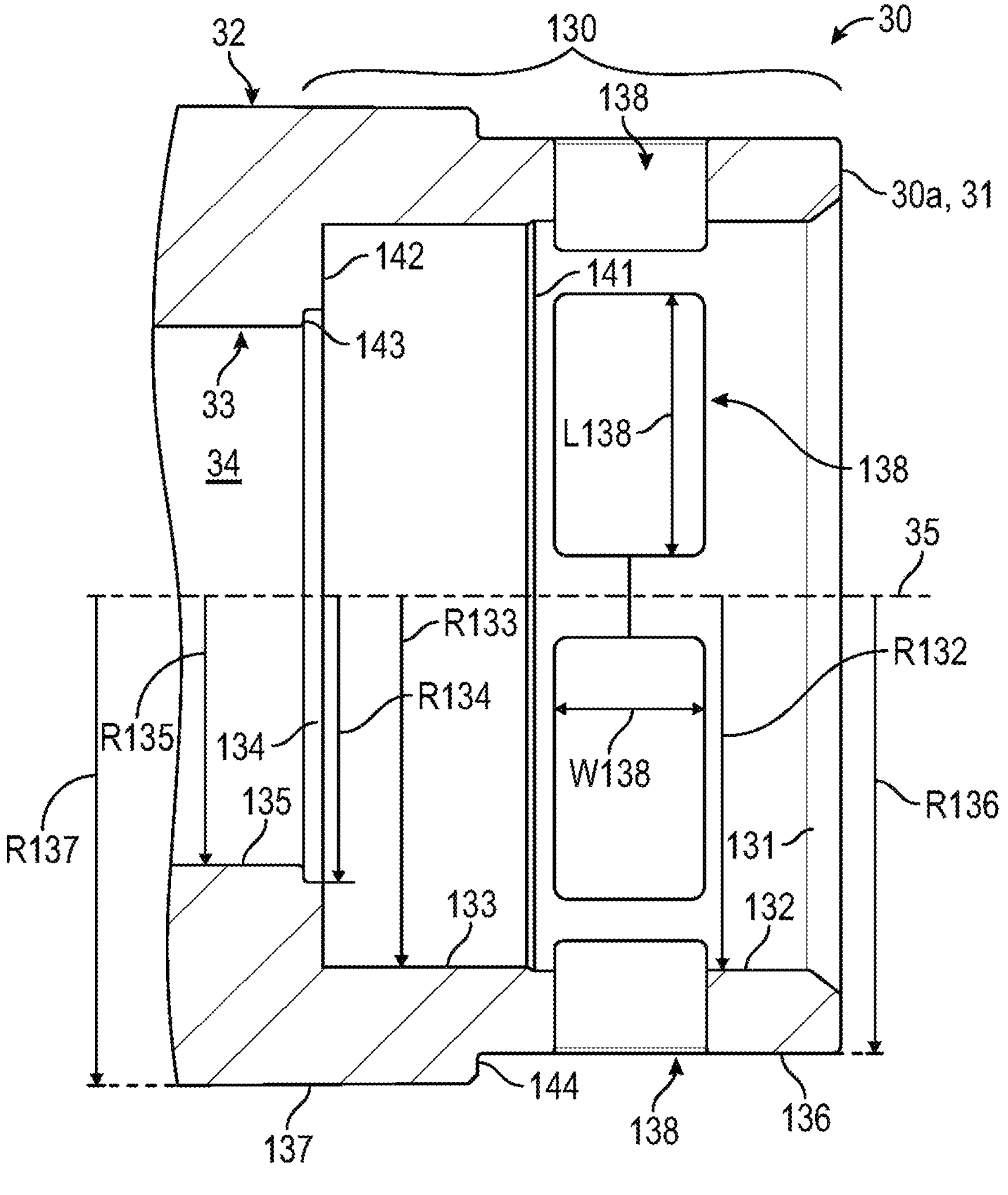
FIG. 4 is a cross-sectional view of the female connection member of FIG. 1.

Referring now to FIG. 4, female connection member 130 defines a generally stepped radially inner profile along inner surface 33 of tubular conduit 30 moving axially from first end 30*a*. More specifically, moving axially from end surface 31 at first end 30*a* along inner surface 33 of tubular conduit 30, the inner profile of female connection member 130 includes an annular chamfer or bevel 131, a first cylindrical surface 132 extending axially from bevel 131 and disposed at a radius R132 relative to central axis 35, a second cylindrical surface 133 disposed at a radius R133 relative to central axis 35, a third cylindrical surface 134 disposed at a radius R134 relative to central axis 35, and a fourth cylindrical surface 135 disposed at a radius R135 relative to central axis 35. Fourth cylindrical surface 135 defines flow passage 34 of second tubular conduit 30. Radius R132 is greater than radius R133, radius R133 is greater than radius R134, and radius R134 is greater than radius R135. Consequently, a first annular shoulder 141 extends radially inward from first cylindrical surface 132 to second cylindrical surface 133, a second annular shoulder 142 extends radially inward from second cylindrical surface 133 to third cylindrical surface 134, and a third annular shoulder 143 extends radially inward from third cylindrical surface 134 to fourth cylindrical surface 135. In this embodiment, each annular shoulder 142, 143 is planar, and more specifically, is disposed in a plane oriented perpendicular to central axis 35. Bevel 131 and shoulder 141 are oriented at acute angles relative to central axis 35 (e.g., 45°) to facilitate insertion of male connection member 110 into female connection member 130. Radius R133 of the second cylindrical surface 133 is the same or substantially the same as radius R112 of second cylindrical surface 112 of male connection member 110.

Referring still to FIG. 4, female connection member 130 also defines a generally stepped radially outer profile along outer surface 32 of tubular conduit 30 moving axially from first end 30*a*. More specifically, moving axially from end surface 31 at first end 30*a* along outer surface 32 of tubular conduit 30, the outer profile of female connection member 130 includes a first cylindrical surface 136 disposed at a radius R136 relative to central axis 35 and a second cylindrical surface 137 disposed at a radius R137 relative to central axis 35. Radius R136 is less than radius R137. Consequently, an annular shoulder 144 extends radially outward from first cylindrical surface 136 to second cylindrical surface 136. In this embodiment, annular shoulder 144 is planar, and more specifically, is disposed in a plane oriented perpendicular to central axis 35.

Referring still to FIG. 4, a plurality of uniformly circumferentially-spaced holes 138 extend radially through female connection member 130 from first cylindrical surface 136 along outer profile of female connection member 130 to first cylindrical surface 132 along inner profile of female connection member 130. In this embodiment, each hole 138 is the same, and thus, one hole 138 will be described it being understood the other holes 138 are the same. Hole 138 has a rectangular prismatic shape defined by four planar surfaces extending radially through female connection member 130. In addition, hole 138 has a radially oriented central axis that intersects axis 35. Further, hole 138 has a length L138 measured circumferentially and a width W138 measured axially. The width W138 of hole 138 is the same or substantially the same as the width W114 of recess 114.

As best shown in FIG. 2, a cylindrical recess or counterbore 139 extends radially into first cylindrical surface 136. Counterbore 139 is axially positioned between holes 138 and annular shoulder 144.

As best shown in FIG. 1, the radially inner profile of female connection member 130 is sized and configured to mate with the radially outer profile of male connection member 110. In particular, when coupling 100 is made up as shown in FIG. 1, planar end surface 31 at first end 30*a* of tubular conduit 30 axially abuts and engages mating planar annular shoulder 122, second cylindrical surface 133 of the inner profile of female connection member 130 is radially opposed to and slidingly engages mating second cylindrical surface 112 of the outer profile of male connection member 110, and holes 138 in female connection member 130 are axially and radially aligned with recess 114 of male connection member 110.

Figure 5:
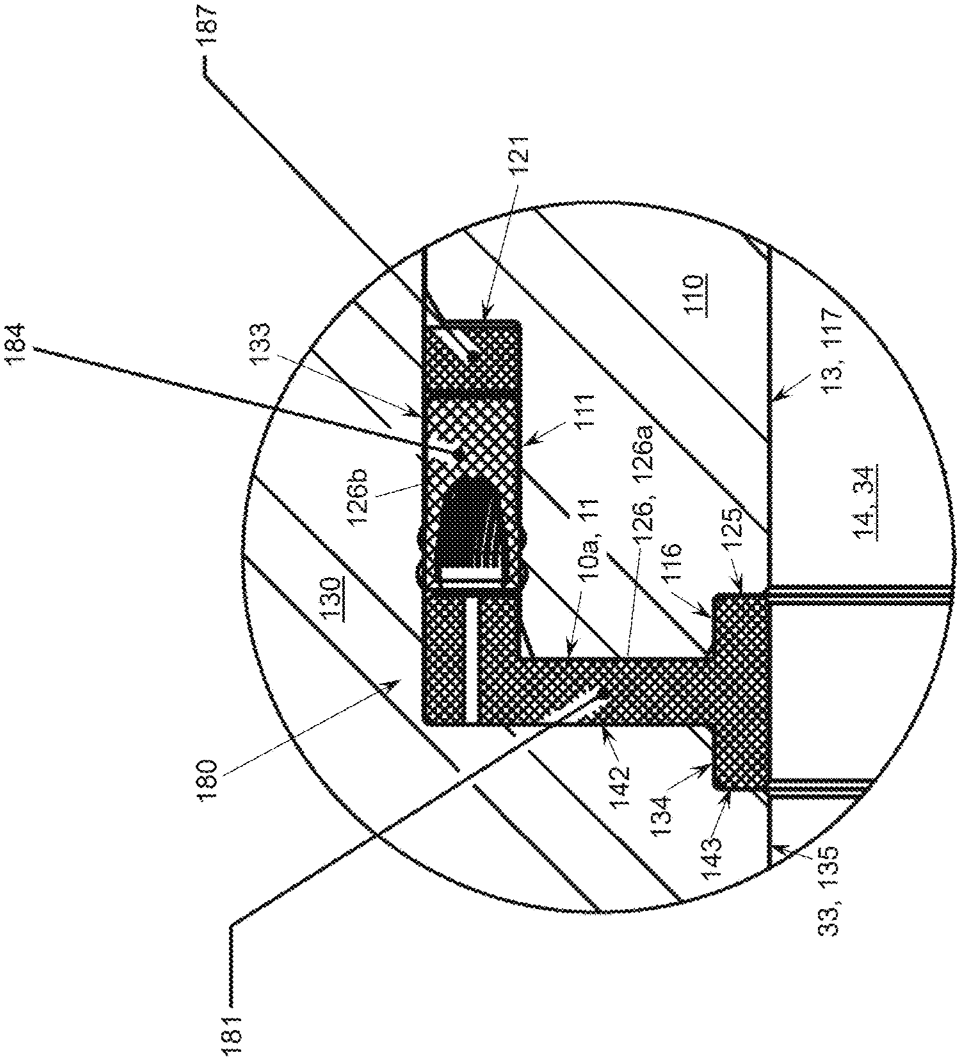
FIG. 5 is an enlarged partial view of the seal assembly of the coupling of FIG. 1 taken in Section 5-5 of FIG. 1.

Referring now to FIGS. 1 and 5, when coupling 100 is made up, planar end surface 11 at first end 10*a* of tubular conduit 10 is axially opposed to and axially spaced from first annular shoulder 142, second annular shoulder 143 of female connection member 130 is axially opposed to and axially spaced from annular shoulder 125 of male connection member 110, first annular shoulder 121 of male connection member 110 is axially opposed to and axially spaced from first annular shoulder 142 of female connection member 130, and first cylindrical surface 111 of male connection member 110 is radially opposed to and radially spaced from second cylindrical surface 133 of female connection member 130. Thus, radius R111 is less than radius R133. Due to the foregoing geometry, an annular recess 126 having a J-shape is formed between the inner profile of female connection member 130 and the outer profile of male connection member 110 extending radially inward from inner surfaces 13, 33 across end 10*a* of male connection member 110 and then axially along end 10*a* between connection members 110, 130. In other words and as best shown in FIG. 3, J-shaped annular recess 126 may be described as having a first annular portion 126*a* extending radially outward (relative to central axes 15, 35) from cylindrical surfaces 117, 135 of tubular conduits 10, 30, respectively, and a second annular portion 126*b* extending axially (relative to axes 15, 35) from first portion 126*a* to first annular shoulder 121. Thus, annular portions 126*a*, 126*b* are oriented perpendicular to each other. As will be described in more detail below, seal assembly 180 is seated in the mating J-shaped annular recess 126.

Figure 7:
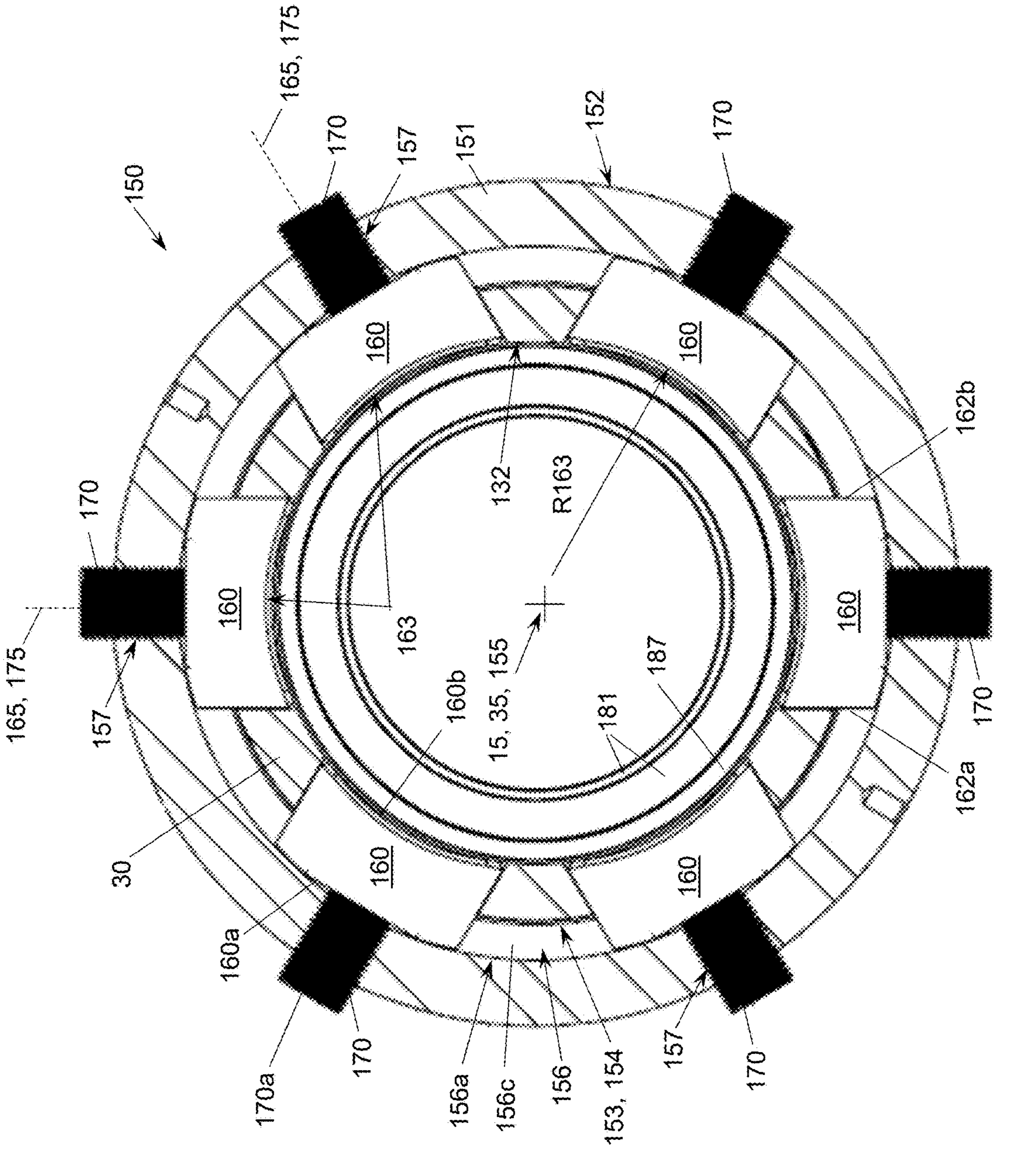
FIG. 7 is a cross-sectional view of the female connection member and locking assembly of FIG. 6 taken in Section 6-6 of FIG. 6.

Referring now to FIGS. 1, 2, and 7, locking assembly 150 releasably locks and secures male connection member 110 within mating female connection member 130. In this embodiment, locking assembly 150 includes an annular locking ring 151, a plurality of locking keys or lugs 160, and a plurality of lock actuation members 170. Locking ring 151 has a central axis 155, a first end 151*a*, a second end 151*b*, a radially outer surface 152 extending axially between ends 151*a*, 151*b*, and a radially inner surface 153 extending axially between ends 151*a*, 151*b*. In this embodiment, each end 151*a*, 151*b* is defined by a planar end surface disposed in a plane oriented perpendicular to axis 155. Radially inner surface 153 includes a cylindrical surface 154 extending axially between ends 151*a*, 151*b* and an annular recess 156 in cylindrical surface 154 axially positioned between ends 151*a*, 151*b*. Recess 156 extends radially outward from cylindrical surface 154. In this embodiment, recess 156 has a rectangular cross-section defined by a cylindrical base surface 156*a* positioned radially outward of cylindrical base surface 154 and a pair of annular shoulders 156*b*, 156*c* extending radially from cylindrical surface 154 to cylindrical base surface 154. In this embodiment, annular shoulders 156*b*, 156*c* are defined by planar surfaces disposed in planes oriented perpendicular to central axis 155. Recess 156 has a width W156 measured axially between annular shoulders 156*b*, 156*c*. The width W156 of recess 156 is the same or substantially the same as the width W114 of recess 114 of male connection member 110 and the width W138 of each hole 138 in female connection member 130. A plurality of uniformly circumferentially-spaced internally threaded throughbores 157 extend radially from outer surface 152 to cylindrical base surface 156*a*. As best shown in FIG. 2, an internally threaded throughbore 158 extends radially from outer surface 152 to cylindrical surface 154. Throughbore 158 is axially spaced from annular recess 114 and is sized to threadably receive a mating set screw 159.

Referring again to FIGS. 1, 2, and 7, in this embodiment, each locking key 160 is the same, and thus, one locking key 160 will be described it being understood the other locking keys 160 are the same. Locking key 160 is a generally rectangular, block-shaped structure having a central axis 165, a first side 160*a*, a second side 160*b* axially opposite first side 160*a*, a pair of elongated lateral sides 161*a*, 161*b*, and a pair of ends 162*a*, 162*b*. Lateral sides 161*a*, 161*b* are defined by planar, parallel surfaces, and ends 162*a*, 162*b* are defined by planar, parallel surfaces oriented perpendicular to lateral sides 161*a*, 161*b*. Locking key 160 is positioned with central axis 165 oriented in a radial direction relative to central axes 155, 15, 35, first side 160*a* facing radially outward and away from central axes 155, 15, 35, and second side 160*b* facing radially inward and toward central axes 155, 15, 35. Accordingly, first side 160*a* may also be described as a radially outer side and second side 160*b* may be described as a radially inner side. In this embodiment, lateral sides 161*a*, 161*b* are defined by parallel, planar surfaces disposed in planes oriented perpendicular to axes 155, 15, 35, and ends 162*a*, 162*b* are defined by parallel planar surfaces oriented perpendicular to lateral sides 161*a*, 161*b* and disposed in planes oriented parallel to axes 155, 15, 35.

Locking key 160 may be described as having a length measured parallel to lateral sides 161*a*, 161*b* between ends 162*a*, 162*b*, and a width W160 measured parallel to ends 162*a*, 162*b* between lateral sides 161*a*, 161*b*. Radially inner side 160*b* is defined by a concave cylindrical surface 163 extending circumferentially between ends 162*a*, 162*b* and oriented parallel to axes 155, 15, 35. Cylindrical surface 163 is disposed at a radius of curvature R163 that is the same or substantially the same as the radius R115 of the base surface 115 of annular recess 114 in male connection member 110.

Locking key 160 is sized and shaped to (i) be matingly received by a corresponding hole 138 in female connection member 130 while slidingly engaging female connection member 130, and (ii) be matingly received by recess 114 while slidingly engaging male connection member 110. Thus, the length of locking member 160 is the same or substantially the same as the length of hole 138, and the width W160 of locking member 160 is the same or substantially the same as the width W136 of the hole 138 and the width W114 of recess 114.

Figure 6:
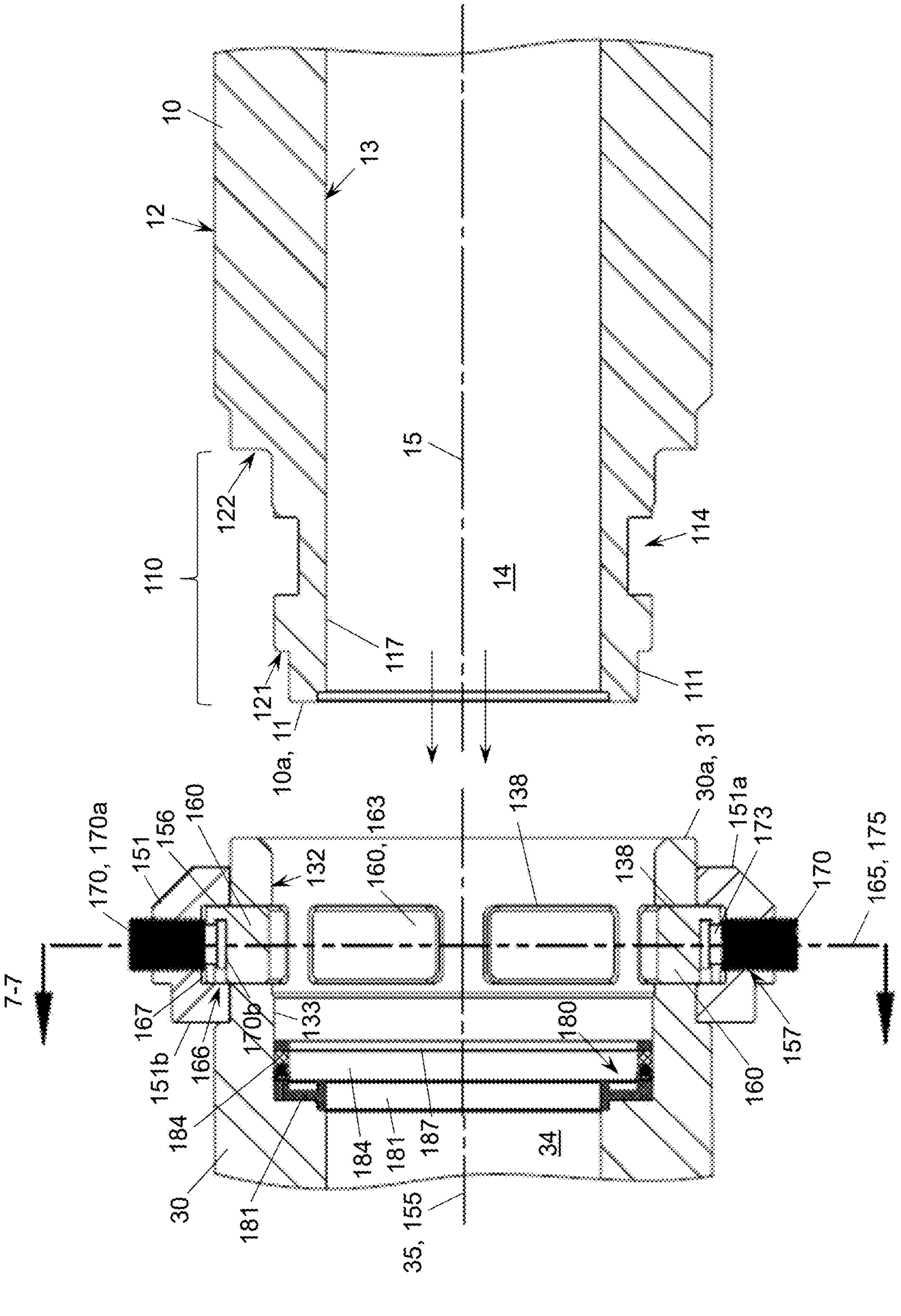
FIG. 6 is a cross-sectional view of the female connection member of FIG. 1 (with the locking assembly of FIG. 1 mounted thereto) and the male connection member of FIG. 1 during assembly of the fluid tight coupling of FIG. 1.

As best shown in FIGS. 1, 2, and 6, locking key 160 also includes a slot 166 for removably, slidingly, and rotatably receiving a mating end of one actuation member 170. Slot 166 extends axially relative to axes 155, 15, 35 from first lateral side 161*a* toward second lateral side 161*b*, and further, slot 166 extends radially inwardly relative to axes 155, 15, 35 from first side 160*a*. A U-shaped flange 167 extends partially into slot 166 along the periphery of slot 166 along outer side 160*a*. Consequently, slot 166 has a generally T-shaped profile.

Referring still to FIGS. 1, 2, and 6, in this embodiment, each lock actuation member 170 is the same, and thus, one lock actuation member 170 will be described it being understood the other lock actuation members 170 are the same. Lock actuation member 170 is a generally cylindrical member having a central axis 175, a first end 170*a*, a second end 170*b*, and a radially outer surface 171 extending axially between ends 170*a*, 170*b*. Lock actuation member 170 is positioned with central axis 175 oriented in a radial direction relative to central axes 155, 15, 35 with first end 170*a* defining a radially outer end of lock actuation member 170 and second end 170*b* defining a radially inner end of lock actuation member 170. Accordingly, first end 170*a* may also be described as a radially outer end, and second end 170*b* may also be described as a radially inner end.

Outer surface 171 of lock actuation member 170 includes external threads extending from first end 170*a*, a cylindrical surface 172 extending axially from end 170*b*, and an annular recess 173 axially positioned between cylindrical surface 172 and the external threads. In this embodiment, recess 173 has a rectangular cross-section in a plane containing central axis 175. Due to recess 173, lock actuation member 170 has a T-shaped profile proximal end 170*b* with an annular flange 174 at end 170*b*. As best shown in FIG. 1, annular flange 174 is sized and shaped to be slidably received by slot 166 (via the open end of mating slot 166 along first lateral side 161*a*) with flange 167 slidably disposed in recess 173. Lock actuation member 170 is free to rotate relative to locking key 160 about axis 175 with flange 174 disposed in slot 166, however, engagement of flanges 174, 167 prevents lock actuation member 170 from being pulled axially relative to central axes 165, 175 from slot 166. As also best shown in FIGS. 1 and 6, the external threads of lock actuation member 170 are sized and shaped to engage mating internal threads of throughbores 157 in locking ring 151. Thus, with the external threads of lock actuation member 170 engaging mating internal threads of throughbores 157, rotation of lock actuation member 170 about central axis 175 relative to locking ring 151 in a first rotational direction moves lock actuation member 170 and the corresponding locking key 160 radially inward relative to axes 15, 35, 155, and rotation of lock actuation member 170 about central axis 175 relative to locking ring 151 in a second rotational direction (opposite the first rotational direction) moves lock actuation member 170 and the corresponding locking key 160 radially outward relative to axes 15, 35, 155. In this manner, rotation of lock actuation member 170 about axis 175 relative to locking ring 151 and corresponding locking key 160 is employed to move locking key 160 radially inward and radially outward relative to axes 15, 35, 155 through the corresponding mating hole 138 in female connection member 130, and radially into and out of mating recess 114 of male connection member 110. In FIG. 1, locking keys 160 are shown in a first or locked position advanced radially inward via corresponding lock actuation members 170 into recess 114 and into engagement with base surface 115 of recess 114, thereby locking connection members 110, 130 together, and in FIGS. 6 and 7, locking keys 160 are shown a second or unlocked position withdrawn radially outward via corresponding lock actuation members 170 from recess 114 and into recess 156 of locking ring 151, thereby allowing connection members 110, 130 to be moved axially (together or apart) relative to each other.

Referring now to FIGS. 1, 2, and 5, seal assembly 180 is disposed in J-shaped annular recess 126, slidingly engages connection members 110, 130, and forms an annular seal between male connection member 110 and female connection member 130, thereby containing pressurized fluids flowing through tubulars 10, 30 within passages 14, 34. As best shown in FIG. 5, in this embodiment, seal assembly 180 includes an annular J-ring 181, an annular pressure energized seal 184, and an annular backup ring 187. Pressure energized seal 184 is axially positioned between and engages J-ring 181 and backup ring 187. J-ring 181 is positioned in first annular portion 126*a* of recess 126 and a portion of second annular portion 126*b* of recess 126 extending from first annular portion 126*a*. Backup ring 187 axially abuts and is seated against first annular shoulder 121 of male connection member 110. In this embodiment, J-ring 181, pressure energized seal 184, and backup ring 187 are made of the same material, and in particular, are made of a composite material including 75 wt % polytetrafluoroethylene (PTFE), 23 wt % carbon, and 2 wt % glass. In other embodiments, one or more of J-ring 181, pressure energized seal 184, and backup ring 187 may be made of other materials (e.g., elastomer, metal or metal alloy, etc.).

Referring still to FIG. 3, pressure energized seal 184 includes an annular cup-shaped recess 185 extending axially (relative to axes 15, 35) at an end generally facing towards first portion 126*a* of recess 126. Thus, recess 185 faces towards the fluids flowing through passages 14, 34 of tubular conduits 10, 30. It should be appreciated that the fluids flowing through passages 14, 34 have pressures greater than the ambient pressure outside of tubular conduits 10, 30 and coupling 100. Seal assembly 180 seals against such pressure differential. Recess 185 faces the relative high-pressure side of such pressure differential, and thus, pressure energized seal 184 is expanded outward and compressed against first cylindrical surface 111 of male connection member 110 and second cylindrical surface 134 of female connection member 130, thereby enhancing the sealing engagement therewith.

As previously described and shown in FIG. 3, J-shaped annular seal assembly 180 is disposed in mating J-shaped annular recess 126 to form an annular seal between connection members 110, 130. The mating J-shape geometries of recess 126 and seal assembly 180 create a tortuous path to reduce and/or prevent debris in the fluids flowing within passages 14, 34 (e.g., sand) from getting between connection members 110, 130.

Referring now to FIGS. 1, 2, and 6, the process for connecting tubular conduits 10, 20 end-to-end with coupling 100 will now be described. In FIG. 1, coupling 100 is shown fully made up, whereas in FIG. 6, coupling 100 is shown during makeup. Prior to advancing male connection member 110 into mating female connection member 130, seal assembly 180 is positioned within female connection member 130 and locking ring 151 is disposed about female connection member 130 as shown in FIG. 6. More specifically, J-ring 181 is coaxially aligned with tubular conduit 30 as shown in FIG. 2 and axially advanced into passage 34 and female connection member 130 at end 30*a* until it is seated against annular shoulders 142, 143 of female connection member 130 and slidingly engages cylindrical surfaces 132, 134 as shown in FIG. 6. Next, pressure energized seal 184 is coaxially aligned with tubular conduit 30 as shown in FIG. 2 and axially advanced into passage 34 and female connection member 130 at end 30*a* until it is seated against J-ring 181 and slidingly engages cylindrical surface 132 of female connection member 130 as shown in FIG. 6. Then, backup ring 187 is coaxially aligned with tubular conduit 30 as shown in FIG. 2 and axially advanced into passage 34 and female connection member 130 at end 30*a* until it is seated against pressure energized seal 184 and slidingly engages cylindrical surface 132 of female connection member 130 as shown in FIG. 6.

Before, during, or after installation of seal assembly 180 in female connection member 130, locking ring 151 is mounted to female connection member 130 and locking assembly 150 is assembled. More specifically, locking ring 151 is coaxially aligned with tubular conduit 30 as shown in FIG. 2 and axially advanced onto female connection member 130 at end 30*a* via sliding engagement of mating cylindrical surfaces 136, 154 of female connection member 130 and locking ring 151, respectively. Locking ring 151 is axially advanced along surface 136 of female connection member 130 until it is seated against annular shoulder 144 as shown in FIG. 6, which also coincides with axial alignment of annular recess 156 of locking ring 151 with holes 138 of female connection member 130. Next, locking ring 151 is rotated relative to female connection member 130 to circumferentially align throughbores 157 of locking ring 151 with holes 138 of female connection member 130 and align throughbore 158 of locking ring 151 with counterbore 139 of female connection member 130. Then, set screw 159 is threaded through mating throughbore 158 and into counterbore 139, thereby securing locking ring 151 to female connection member 130 such that locking ring 151 cannot move rotationally or translationally relative to female connection member 130. Throughbore 158 and counterbore 139 are positioned such that alignment of throughbore 158 with counterbore 139 simultaneously results in circumferential alignment and centering of throughbores 157 and holes 138. Before, during, or after mounting and securing locking ring 151 to female connection member 151, lock actuation members 170 are threaded into corresponding throughbores 157 in locking ring 151. In particular, each lock actuation member 170 is coaxially aligned with a corresponding throughbore 157, second end 170*b* is axially advanced into the corresponding throughbore 157, and then the lock actuation member 170 is rotated to thread it into the corresponding throughbore 157.

After mounting and securing locking ring 151 to female connection member 151 and threading lock actuation members 170 into corresponding throughbores 157 in locking ring 151, lock actuation members 170 are further rotated to threadably advance lock actuation members 170 radially inward until flanges 174 and recesses 173 of lock actuation members 170 are positioned radially inward of second cylindrical surface 132 of female connection member 130. Next, one locking key 160 is slidingly and rotatably coupled to each lock actuation member 170 from within female connection member 130 (i.e., from within passage 34) by advancing the flange 174 of the lock actuation member 170 into the locking slot 166 of the corresponding locking key 160 with flange 167 of the locking key 160 disposed in the recess 173 of the lock actuation member 170. Then, each locking key 160 is rotated about axis 175 of the corresponding lock actuation member 170 to align the locking key 160 with the corresponding hole 138 in female connection member 130 with lateral side 161*b* including the open end of slot 166 facing axially away from end 30*a*. For each locking key 160, once the locking key 160 is aligned with the corresponding hole 138, the corresponding lock actuation member 170 is rotated about axis 175 relative to the locking key 160 and locking ring 151 to move the lock actuation member 170 and locking key 160 radially outward and draw the corresponding locking key 160 into the corresponding hole 138 in female connection member 130 and annular recess 156 of locking ring 150. Each locking key 160 is moved radially outward in this manner until it is completely withdrawn from passage 34 and positioned entirely radially outward of second cylindrical surface 132 of female connection member 130 as shown in FIGS. 6 and 7.

With seal assembly 180 installed in female connection member 130 and locking assembly 150 mounted to female connection member 130 with locking keys 160 withdrawn from passage 34 as shown in FIG. 6, tubular conduits 10, 30 are coaxially aligned and male connection member 110 is axially inserted into female connection member 130 with mating cylindrical surfaces 112, 133 of connection members 110, 130 slidingly engaging each other. Male connection member 110 is axially advanced into female connection member 130 until end surface 11 axially abuts J-ring 181 with cylindrical surface 111 slidingly engaging pressure energized seal 184 and backup ring 187, thereby forming an annular seal between connection members 110, 130. Simultaneous with axial abutment of end surface 11 with J-ring 181, annular shoulder 121 axially abuts backup ring 187, cylindrical surfaces 112, 133 slidingly engage, end surface 31 and annular shoulder 122 axially abut, and recess 114 is axially and radially aligned with holes 138 and locking keys 160.

Once male connection member 110 is fully seated in female connection member 130, locking keys 160 are advanced radially inward and fully seated in mating recess 114 of male connection member 110 to secure and lock connection members 110, 130 together and complete coupling 100 as shown in FIG. 1. In particular, each lock actuation member 170 is rotated about axis 175 relative to the corresponding locking key 160, locking ring 151, and connection members 110, 130 to move the lock actuation member 170 and locking key 160 radially inward out of the corresponding recess 156 in locking ring 151, through the corresponding hole 138 in female connection member 130, and into recess 114 of male connection member 110. As previously described, the width W160 of each locking key 160 is the same or substantially the same as the width W156 of recess 156 of locking ring 151, the width W138 of the corresponding hole 138 in female connection member 130, and the width W114 of recess 114 in male connection member 110. Thus, locking keys 160 slidingly engage shoulders 156*b*, 156*c* defining recess 156 of locking ring 151, the surfaces of female connection member 130 defining holes 138, and shoulders 123, 124 of male connection member 110 defining recess 114. Locking keys 160 are advanced radially inward until fully seated in recess 114 with cylindrical surface 163 of second side 160*b* radially abutting and seated against mating cylindrical surface 115. As best shown in FIG. 1, with locking keys 160 fully seated in annular recess 114 of male connection member 110, both lateral sides 161*a*, 161*b* of locking key 160 slidingly engage axially opposed planar shoulders 123, 124 of male connection member 110 and slidingly engage the axially opposed planar surfaces defining the corresponding holes 138 of female connection member 130. As a result, locking keys 160 prevent connection members 110, 130 from moving axially relative to each other, thereby securing locking connection members 110, 130 (and hence tubular conduits 10, 30) together end-to-end. As best shown in FIG. 1, when coupling 100 is fully made up, locking ring 151 is disposed about both connection members 110, 130, locking keys 160 are radially positioned between locking ring 151 and male connection member 110, and locking keys 160 extend radially through holes 130 of female connection member 130 into engagement with male connection member 110.

In the manner described, flangeless coupling 100 is made up to connect and form a fluid tight seal between tubular conduits 10, 30. Makeup of coupling 100 reduces and/or eliminates the need for torque wrenches, thereby reducing safety risks associated with torque wrenches. In addition, coupling offers the potential for enhanced makeup speed as compared to conventional flanged connections.

Figure 8:
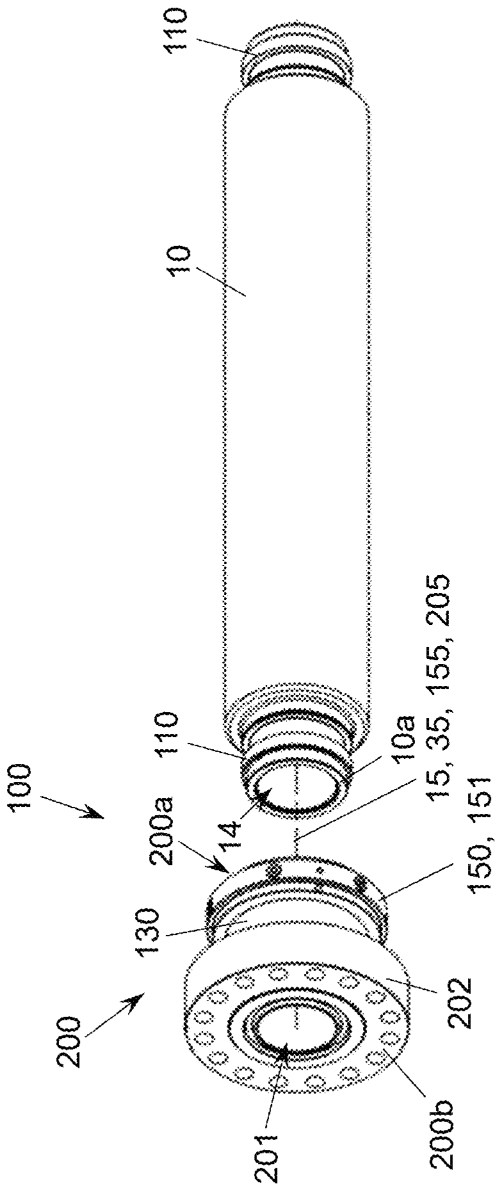
FIG. 8 is an exploded view of the fluid tight coupling of FIG. 1 for connecting a tubular conduit to an adapter.
Figure 9:
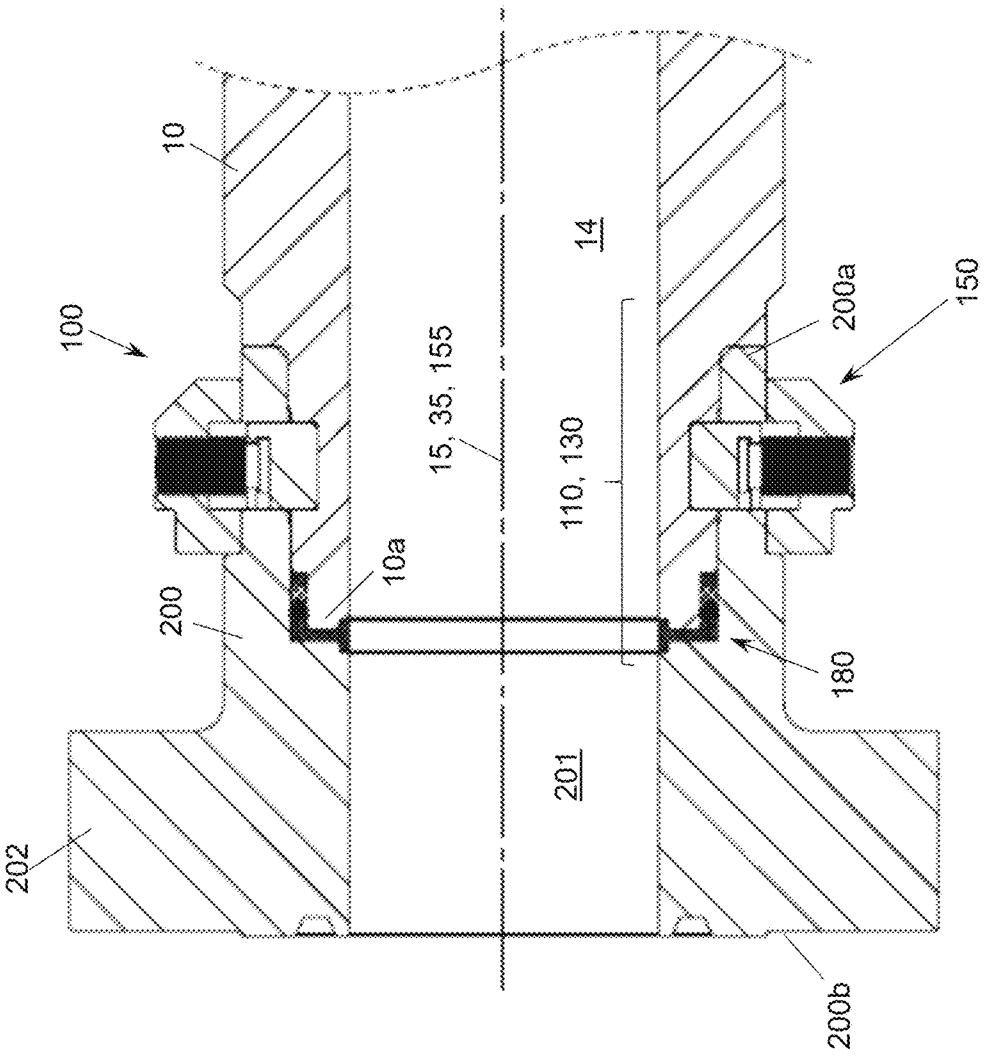
FIG. 9 is a cross-sectional view of the fluid tight coupling, the tubular conduit, and the adapter of FIG. 8.

As previously described, in FIG. 1, fluid transport, control, or containment devices 10, 30 connected with coupling 100 are tubular conduits. However, coupling 100 can also be used to connect other types of fluid transport, control, or containment devices. For example, coupling 100 can be used to connect an end of a tubular conduit (e.g., tubular conduit 10 or tubular conduit 30) to another type of fluid transport, control, or containment device such as an adapter or fitting. For example, in FIGS. 8 and 9, coupling 100 connects end 10 of tubular conduit 10 as previously described to an adapter 200 for connecting to another conduit or equipment. More specifically, in this embodiment, adapter 200 has a central axis 205, a first end 200*a*, a second end 200*b* opposite end 200*a*, and a central throughbore 201 extending axially from first end 200*a* to second end 200*b*. First end 200*a* comprises a female connection member 130 as previously described and second end 200*b* comprises a flange 202. Coupling 100 is made up in the same manner as previously described to provide a fluid tight connection between adapter 200 and tubular conduit 10, thereby allowing fluid communication between throughbores 201, 14. Flange 202 at end 200*b* of adapter 200 can be connected to a flange of another tubular conduit or a flange integral with another type of fluid transport, control, or containment device. In this manner, adapter 200 enables tubular conduit 10 to transition over to other types of connections for retrofitting.

Figure 10:
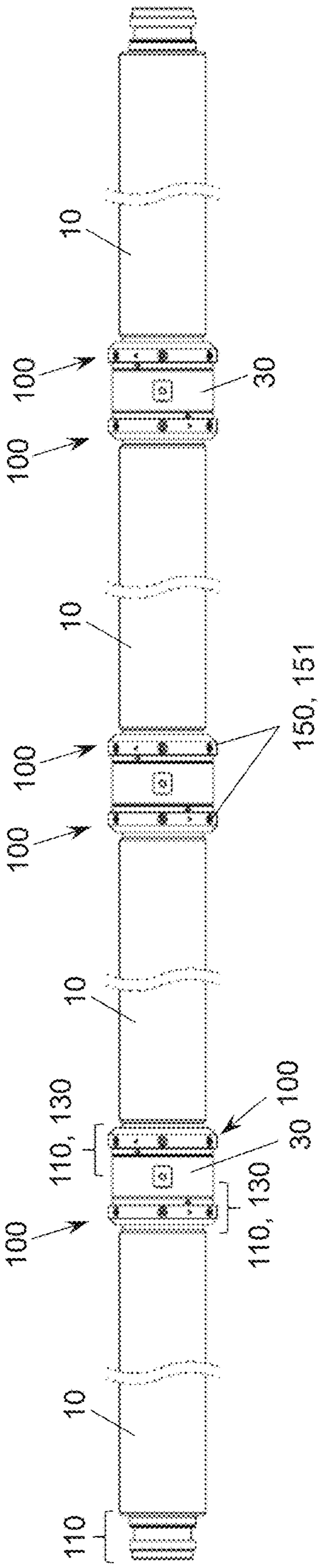
FIG. 10 is a side view of a plurality of the fluid tight couplings of FIG. 1 connecting a plurality of tubular conduits end-to-end.
Figure 11:
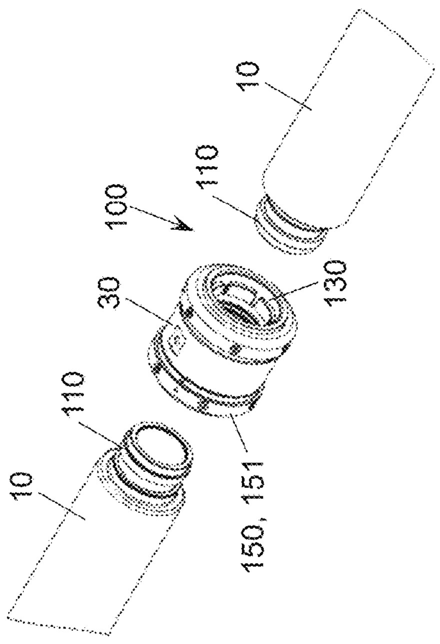
FIG. 11 is an enlarged, exploded view of two of the adjacent fluid tight couplings of FIG. 10.

As yet another example, in FIGS. 10 and 11, a plurality of couplings 100 as previously described are used to provide fluid tight connections between a plurality of tubular conduits 10, 30 as previously described. In this embodiment, each tubular conduit 30 includes a female connection member 130 at each end 30*a*, 30*b* and each tubular conduit 10 includes a male connection member 110 at each end 10*a*,

10*b*. In this manner, any desired number of tubular conduits 10, 30 can be connected end-to-end via couplings 100 to form a pipeline.

Figure 12:
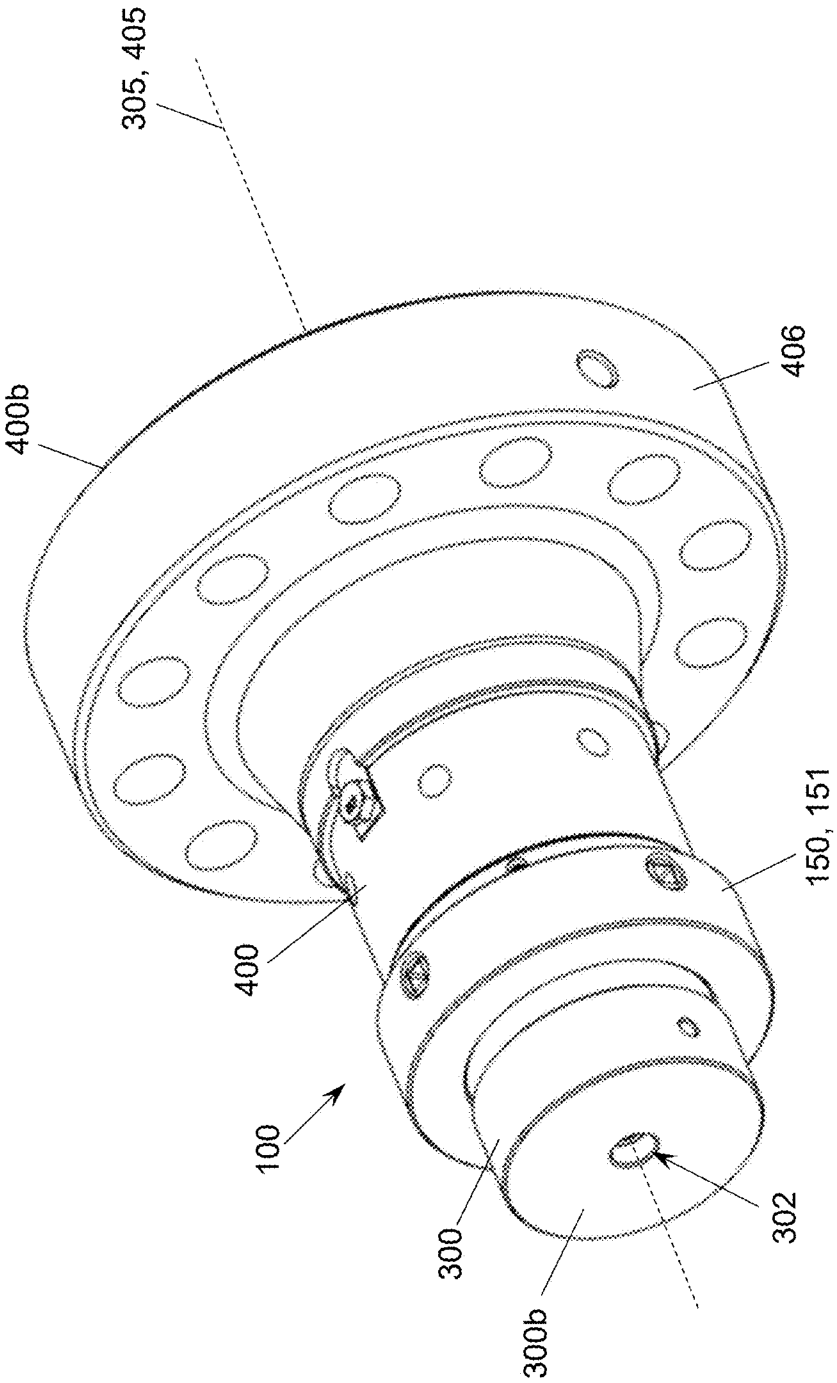
FIG. 12 is a perspective view of the fluid tight coupling of FIG. 1 connecting an adapter to a dart check valve.
Figure 13:
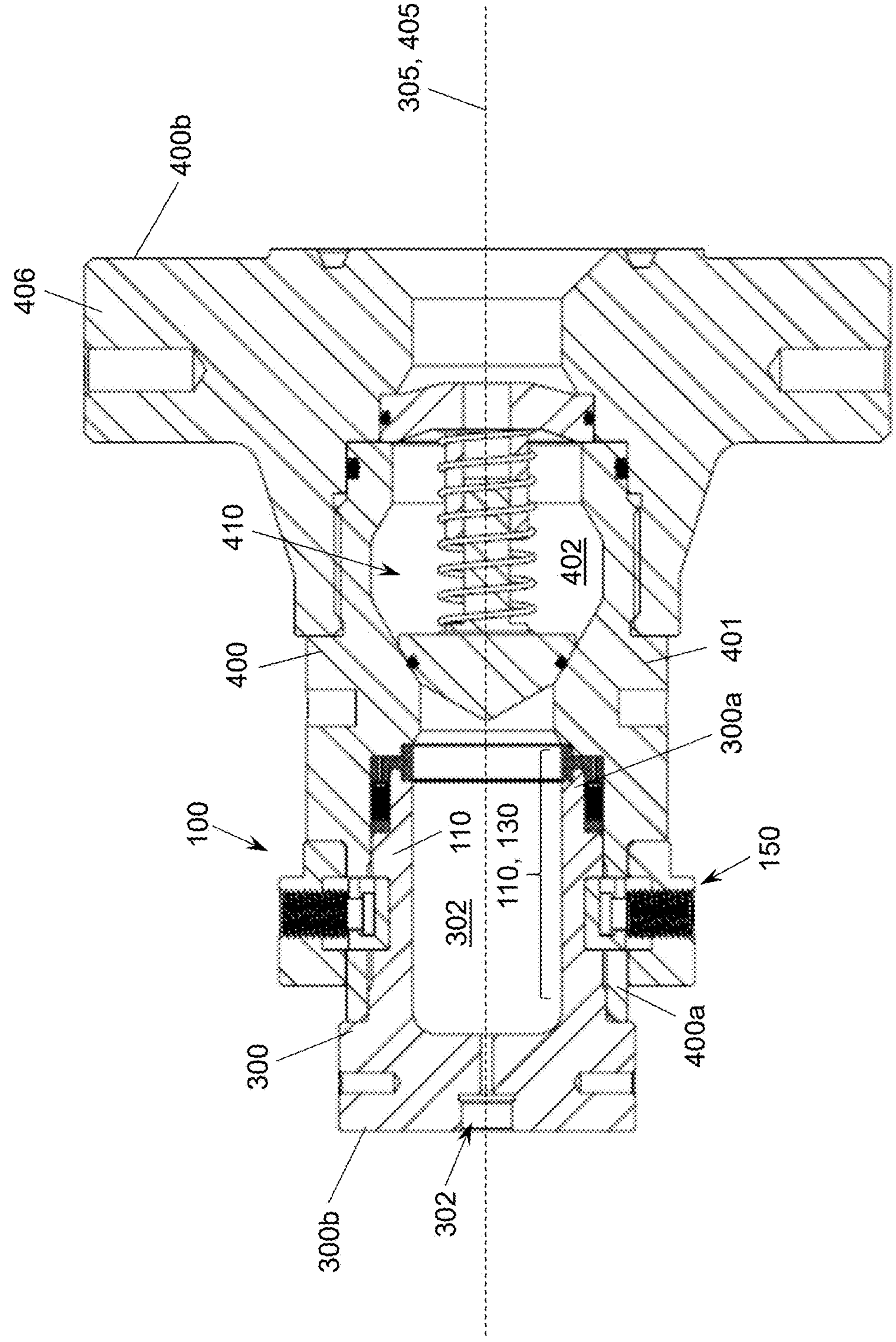
FIG. 13 is a cross-sectional view of the fluid tight coupling, the adapter, and the dart check valve of FIG. 12.

As yet another example, in FIGS. 12 and 13, a coupling 100 as previously described is used to connect a test plug 300 to a dart check valve 400. More specifically, test plug 300 has a central axis 305, a first end 300*a*, and a second end 300*b*. In addition, test plug 300 includes an inner chamber or cavity 301 extending axially first end 300*a* and a test port 302 extending axially from second end 300*b* to cavity 301. First end 300*a* comprises a male connection member 110 as previously described, whereas second end 300*b* is generally closed with the exception of test port 302.

Dart check valve 400 includes an outer valve body 401 and a valve assembly 410 disposed within body 401. Valve body 401 has a central axis 405, a first end 401*a*, a second end 401*b* opposite first end 401*a*, and flow passage 402 extending axially from first end 400*a* to second end 400*b*. Valve assembly 410 is disposed along flow passage 402 and controls the flow of fluids therethrough between ends 401*a*, 401*b*. First end 400*a* of dart check valve 400 comprises a female connection member 130 as previously described, whereas second end 400*b* comprises a flange 406.

Coupling 100 is made up in the same manner as previously described to provide a fluid tight connection between test plug 300 and dart check valve 400, thereby allowing fluid communication between cavity 301 and flow passage 402 when valve assembly 410 is in an open position. Flange 406 at end 400*a* can be connected to a flange of another tubular conduit or a flange integral with another type of fluid transport, control, or containment device.

Figure 14:
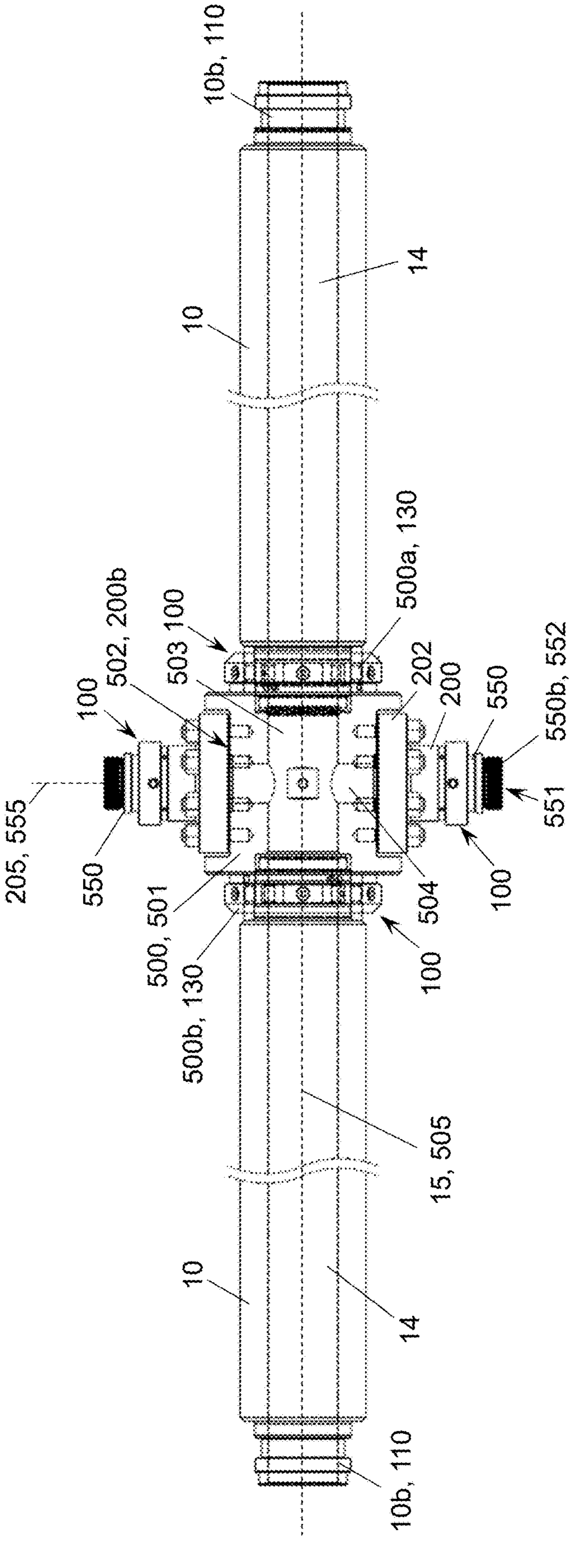
FIG. 14 is a top view of an assembly including an embodiment of a flow cross coupled to a pair of tubular conduits with the fluid tight couplings of FIG. 1, and a pair of adapter coupled to the flow cross with flanges and coupled to a pair of cross-over couplings with the fluid tight couplings of FIG. 1.
Figure 15:
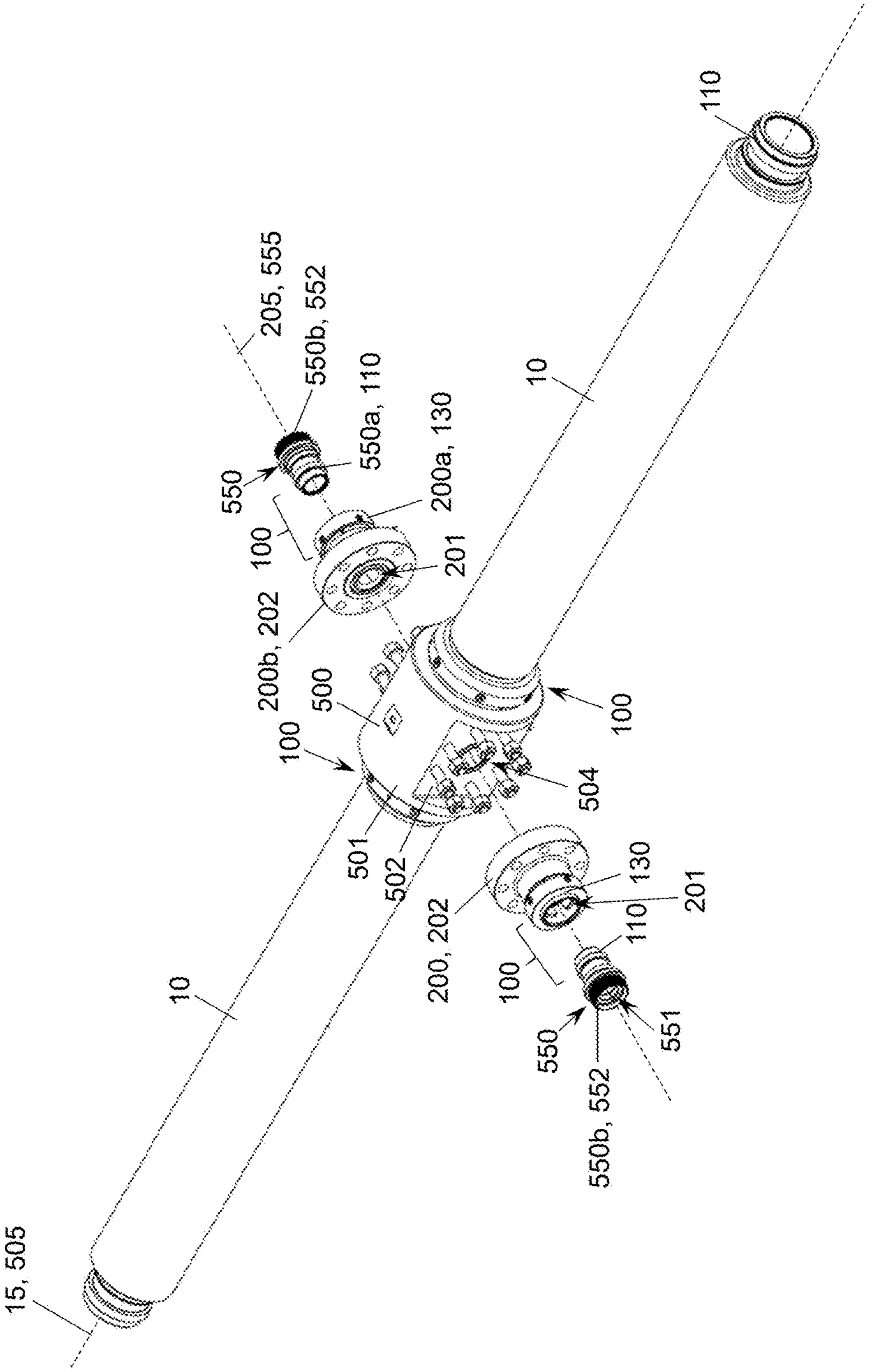
FIG. 15 is a partially exploded view of the assembly of FIG. 14.

As still yet another example, in FIGS. 14 and 15, a pair of couplings 100 as previously described are used to provide fluid tight connections between a flow cross 500 and a pair of tubular conduits 10, and a pair of couplings 100 as previously described are used to provide fluid tight connections between a pair of adapters 200 coupled to flow cross 500 and a pair of crossover couplings 550. Conduits 10 and adapters 200 are as previously described. In particular, each tubular conduit 10 includes a male connection member 110 at each end 10*a*, 10*b*, and each adapter 200 includes female connection member 130 as previously described at end 200*a* and flange 202 at second end 200*b*.

Flow cross 500 provides fluid communication between conduits 10 and adapters 200. In particular, flow cross 500 has a central axis 505, a first end 500*a*, and a second end 500*b* opposite end 500*a*. Each end 500*a*, 500*b* comprises a female connection member 130 as previously described. Flow cross 500 has a radially outer cylindrical surface 501 extending axially between female connection members 130. A pair of circumferentially-spaced planar flats 502 are disposed along cylindrical outer surface 501 between female connection members 130. Still further, flow cross 500 includes a central throughbore 503 extending axially from first end 500*a* to second end 500*b*, and a cross-bore 504 extending radially from one flat 502 to the other flat 502. Cross-bore 504 intersects and extends across central throughbore 503, and thus, throughbore 503 and cross-bore 504 are in direct fluid communication. One coupling 100 connects each end 500*a*, 500*b* of flow cross 500 with a conduit 10, thereby providing fluid communication between flow passages 14 of conduits 10, throughbore 503 of flow cross 500, and cross-bore 504 of flow cross 500.

Flange 202 at end 200*b* of adapter 200 is positioned flush with one of the flats 502 of flow cross 500 and bolted thereto. An annular seal is provided between each flange 202 and the corresponding flat 502. Thus, central throughbore 201 of each adapter 200 is in fluid communication with cross-bore 504 of flow cross 500, and thus, is also in fluid communication with throughbore 503 of flow cross 500 and flow passages 14 of conduits 10.

Crossover couplings 550 are releasably coupled to adapters 200 with couplings 100 to allow adapters 200 to be connected to a variety of different types of connections employed on fluid transport, control, or containment devices. More specifically, each crossover coupling 550 has a central axis 555, a first end 550*a*, a second end 550*b* opposite end 550*a*, and a throughbore 551 extending axially from end 550*a* to end 550*b*. End 550*a* of each crossover coupling 550 comprises a male connection member 110 as previously described. In this embodiment, end 550*b* of each crossover coupling 550 comprises external threads 552 for threadably engaging mating female threads of another fluid transport, control, or containment device. In other embodiments, end 550*b* of one or more crossover couplies 550 may comprises a different connection type such as internal threads, clamp hub connector, etc. One coupling 100 connects end 550*a* of each crossover coupling 550 with end 200*a* of a corresponding adapter 200, thereby providing fluid communication between throughbore 551 of each crossover coupling 550 and throughbore 201 of the corresponding adapter 200. Thus, throughbores 551 of crossover couplings 550, throughbores 201 of adapters 200, cross-bore 504 of flow cross 500, throughbore 503 of flow cross 500, and flow passages 14 of conduits 10 are in fluid communication.

Each coupling 100 shown in FIGS. 14 and 15, and described above, is made up in the same manner as previously described to provide fluid tight connections between flow cross 500 and tubular conduits 10, and fluid tight connections between adapters 200 and crossover couplings 550. As previously described, ends 550*b* of crossover couplings 550 can be connected to another fluid transport, control, or containment device.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

Each and every claim is incorporated into the specification as an aspect of the present disclosure. Thus, the claims are a further description and are an addition to the aspects of the present invention. The discussion of a reference herein is not an admission that it is prior art to the presently disclosed subject matter, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A coupling for forming a fluid-tight connection between a first device and a second device, wherein each device is configured to transport, contain, or control a fluid, the coupling comprising:

a male connection member having a central axis and a radially outer surface;

a female connection member having a central axis coaxially aligned with the central axis of the male connection member, a radially inner surface, and a radially outer surface, wherein the female connection member includes a plurality of circumferentially-spaced holes extending radially from the radially outer surface of the female connection member to the radially inner surface of the female connection member, wherein the male connection member is slidingly disposed in the female connection member;

a locking assembly configured to secure the female connection member to the male connection member, wherein the locking assembly comprises:

an annular locking ring disposed about the female connection member and the male connection member;

a plurality of circumferentially-spaced locking keys moveably coupled to the annular locking ring, wherein the locking keys are radially positioned between the annular locking ring and the male connection member;

a plurality of circumferentially-spaced lock actuation members coupled to annular locking ring, wherein the lock actuation members are configured to move the locking keys radially inward relative to the annular locking ring, the female connection member, and the male connection member through the holes of the female connection member and into engagement with the male connection member, and wherein the lock actuation members are configured to move the locking keys radially outward relative to the annular locking ring, the female connection member, and the male connection member through the holes of the female connection member and out of engagement with the male connection member;

an annular seal assembly positioned between the male connection member and the female connection member, wherein the seal assembly is configured to form an annular seal between the male connection member and the female connection member.

2. The coupling of claim 1, wherein the annular locking ring has a central axis, a first end, a second end opposite the first end, and a radially inner surface extending from the first end to the second end of the annular locking ring;

wherein the radially inner surface of the annular locking ring slidingly engages the radially outer surface of the female connection member.

3. The coupling of claim 2, wherein the radially inner surface of the annular locking ring comprises an annular recess configured to receive the plurality of locking keys.

4. The coupling of claim 3, wherein each locking key includes:

a first position seated in the annular recess of the annular locking ring and radially withdrawn from the male connection member; and a second position engaging the male connection member and positioned radially outside the annular recess of the annular locking ring.

5. The coupling of claim 1, wherein each lock actuation member has a central axis, a first end, a second end opposite the first end, and a radially outer surface extending axially from the first end to the second end;

wherein each lock actuation member is rotatably coupled to the corresponding locking key at the second end;

wherein the radially outer surface of each lock actuation member includes external threads that engage mating internal threads of a corresponding through bore in the annular locking ring.

6. The coupling of claim 5, wherein each lock actuation member comprises an annular flange at the second end that is slidably disposed in a slot of the corresponding locking key.

7. The coupling of claim 1, wherein the seal assembly is disposed in a J-shaped recess positioned between the male connection member and the female connection member, wherein the J-shaped recess extends radially outward from the radially inner surfaces of the female connection member and the male connection member.

8. The coupling of claim 1, wherein each locking key is slidably seated in an annular recess in the radially outer surface of the male connection member.

9. A coupling for forming a fluid-tight connection between a first device and a second device, wherein each device is configured to transport, contain, or control a fluid, the coupling comprising:

a male connection member having a central axis and a radially outer surface;

a female connection member having a central axis coaxially aligned with the central axis of the male connection member, a radially inner surface, and a radially outer surface, and wherein the female connection member includes a plurality of circumferentially-spaced holes extending radially from the radially outer surface of the female connection member to the radially inner surface of the female connection member;

a locking assembly configured to releasably lock the female connection member within the male connection member, wherein the locking assembly comprises:

an annular locking ring disposed about the female connection member and the male connection member; and a plurality of circumferentially-spaced locking keys moveably coupled to the annular locking ring, wherein each locking key comprises:

a locked position extending radially through one of the holes in the in the female connection member and into engagement with the male connection member; and an unlocked position radially withdrawn from engagement with the male connection member.

10. The coupling of claim 9, further comprising:

a plurality of circumferentially-spaced lock actuation members threadably coupled to annular locking ring and configured to move the locking keys radially inward from the locked positions and the locked positions and move the locking keys radially outward from the locked positions to the unlocked positions.

11. The coupling of claim 10, wherein each lock actuation member is rotatably coupled to the annular locking ring and rotatably coupled to the corresponding locking key.

12. The coupling of claim 9, wherein the male connection member includes an annular recess extending radially inward from the radially outer surface of the male connection member and extending circumferentially about the male connection member, wherein the locking keys are seated in the annular recess of the male connection member in the locked positions and are radially withdrawn from the annular recess of the male connection member in the unlocked positions.

13. The coupling of claim 12, wherein each locking key has a radially inner side comprising a cylindrical surface;

wherein the annular recess of the male connection member is defined by an annular base cylindrical surface and a pair of annular shoulders extending radially outward from the annular base cylindrical surface to the radially outer surface of the male connection member;

wherein the cylindrical surface of the each locking key has a radius of curvature and the annular base cylindrical surface of the annular recess of the male connection member is disposed at a radius relative to the central axis of the male connection member, and wherein the radius of curvature of the cylindrical surface of the each locking key is the same as the radius of the annular base cylindrical surface of the annular recess of the male connection member.

14. The coupling of claim 9, wherein a radially inner surface of the annular locking ring comprises an annular recess configured to slidingly receive the plurality of locking keys.

15. The coupling of claim 11, wherein each locking key is at least partially disposed in the annular recess of the annular locking ring in the unlocked; and wherein each locking key is positioned radially outside the annular recess of the annular locking ring in the locked position.

16. A method for forming a fluid-tight connection between a first device and a second device, wherein each device is configured to transport, contain, or control a fluid, the method comprising:

(a) mounting an annular locking ring to a female connection member of the first device, wherein the annular locking ring slidingly engages a radially outer surface of the female connection member;

(b) moveably coupling a plurality of circumferentially-spaced locking keys to the annular locking ring;

(c) coaxially aligning a central axis of the female connection member and a central axis of a male connection member;

(d) moving the male connection member and the female connection member axially together to axially advance the male connection member into the female connection member after (c);

(e) slidingly engaging a radially outer surface of the male connection member and a radially inner surface of the female connection member during (d);

(f) moving the plurality of locking keys radially inward relative to the annular locking ring, through the female connection member, and into engagement with the male connection member after (d).

17. The method of claim 16, wherein (a) occurs before (b).

18. The method of claim 17, wherein (d) occurs after (a) and (b).

19. The method of claim 16, wherein (b) comprises rotatably coupling each locking key to a radially inner end of a lock actuation members threadably engaging the annular locking ring.

20. The method of claim 16, further comprising moving the locking keys radially outward relative to the annular locking ring and the female connection member after (a) and (b) and before (d), (e), and (f).

21. The method of claim 20, wherein the locking keys are moved radially outward into an annular recess disposed in a radially inner surface of the annular locking ring.

22. The method of claim 21, wherein the locking keys are moved radially inward into an annular recess in the radially outer surface of the first tubular conduit along the male connection member during (f).

* * * * *